(12) United States Patent
Westphal

(10) Patent No.: US 10,459,998 B1
(45) Date of Patent: Oct. 29, 2019

(54) SYSTEM AND METHOD FOR PROVIDING A USER INTERFACE WITH CONTEXTUAL SEARCH RESULT FILTERING CAPABILITY

(71) Applicant: W.W. Grainger, Inc., Lake Forest, IL (US)

(72) Inventor: Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 0 days.

(21) Appl. No.: 15/948,330

(22) Filed: Apr. 9, 2018

(51) Int. Cl.
*G06F 16/9538* (2019.01)
*G06F 16/9535* (2019.01)
*G06F 3/0482* (2013.01)

(52) U.S. Cl.
CPC ........ *G06F 16/9535* (2019.01); *G06F 3/0482* (2013.01); *G06F 16/9538* (2019.01)

(58) Field of Classification Search
CPC .... H04W 4/02; G06F 3/0482; G06F 16/9538; G06F 16/9536
See application file for complete search history.

(56) References Cited

U.S. PATENT DOCUMENTS

| | | | | |
|---|---|---|---|---|
| 6,618,683 | B1 * | 9/2003 | Berstis | G01C 21/165 340/10.1 |
| 7,546,289 | B2 * | 6/2009 | Westphal | G06F 16/951 |
| 7,788,248 | B2 * | 8/2010 | Forstall | G06F 16/951 707/706 |
| 9,467,515 | B1 * | 10/2016 | Penilla | B60L 11/1822 |
| 10,147,127 | B2 * | 12/2018 | Westphal | G06Q 30/0635 |
| 2002/0050932 | A1 * | 5/2002 | Rhoades | G08B 13/1965 340/870.16 |
| 2006/0206454 | A1 * | 9/2006 | Forstall | G06F 16/951 |
| 2012/0253984 | A1 * | 10/2012 | Westphal | G06F 16/345 705/27.1 |
| 2013/0018914 | A1 * | 1/2013 | Westphal | G06F 16/93 707/769 |
| 2014/0172638 | A1 * | 6/2014 | El-Hmayssi | G06Q 30/0613 705/26.41 |
| 2014/0172744 | A1 * | 6/2014 | El-Hmayssi | G06Q 30/0282 705/347 |

(Continued)

*Primary Examiner* — Maikhanh Nguyen
(74) *Attorney, Agent, or Firm* — Greenberg Traurig, LLP

(57) ABSTRACT

A graphical user interface has an input element for receiving from a user a search criteria to be submitted to a server device having an associated search engine and an associated repository of items wherein each item in the repository of items is cross-referenced to one or more contextual filters and wherein the one or more contextual filters correspond to sensor obtained data. As the user provides the search criteria, the system functions to dynamically and automatically suggest to the user within the graphical user interface one or more of the contextual filters from the repository of items as a function of the search criteria being provided and data obtained from one or more sensors resident on the computing device. In response to the search criteria being finally submitted as a search request, the search engine is caused to use the search criteria to locate within the repository of items one or more items and, thereafter, to filter the located one or more items as a function of the selected one or more of the suggested contextual filters. The filtered one or more items are returned as a search result.

20 Claims, 3 Drawing Sheets

(56) References Cited

U.S. PATENT DOCUMENTS

| 2017/0018165 | A1* | 1/2017 | Klein | G08B 21/187 |
| 2017/0055112 | A1* | 2/2017 | Westphal | G06F 3/0482 |
| 2018/0039406 | A1* | 2/2018 | Kong | G06F 3/0482 |

* cited by examiner

SYSTEM AND METHOD FOR PROVIDING A USER INTERFACE WITH CONTEXTUAL SEARCH RESULT FILTERING CAPABILITY

BACKGROUND

Systems and methods that use a context, for example, a geographical location, to provide various types of services are generally known in the art.

For example, commonly assigned U.S. Pat. No. 9,727,907 describes an e-commerce system in which a current geographic location of a mobile device, such as a smart phone, tablet computer, or the like, is used to retrieve contextually related information, specifically information about one or more items that have been delivered/shipped to one or more locations in the vicinity of the current geographic location of the mobile device. The information provides details about the items and a user interface element for allowing, among other things, items to be ordered for delivery.

Similarly, commonly assigned U.S. Publication No. 2010/0325015 describes an image recognition system that functions to discern a context for an image uploaded to an e-commerce system. A user is thereafter presented with a user interface having recommendations for items that are relevant to the discerned context for the uploaded image.

Yet further, commonly assigned U.S. Publication No. 2014/0279248 describes a user interface having a search refinement tool that incorporates contextual information, such as supply chain information, for the purpose of providing a customer with the ability to refine search results on an e-commerce website. Supply chain information refers to historical information about a purchaser and the purchaser's previous purchases.

Still further, commonly assigned U.S. Pat. No. 7,849,082 describes a system that uses geo-location information associated with a user's interaction with an e-commerce web site portal to deduce a context for the user's interaction and then uses the deduced context to influence the display of web site content that is provided in response to the user's interaction. The context is deduced by considering one or more of an industrial density for a locale indicated by the geo-location information associated with the user's interaction, a current time for a locale indicated by the geo-location information associated with the user's interaction, a weather condition for a locale indicated by the geo-location information associated with the user's interaction, and a regulation for a locale indicated by the geo-location information associated with the user's interaction.

The disclosure within each of these publications is incorporated herein by reference in their entirety.

SUMMARY

The following describes a system and method for automatically and dynamically providing a user interface with contextual search result filtering capability. As will be appreciated from the description that follows, this improved user interface allows a user to more quickly locate items of interest as compared to user interfaces that are currently being provided with e-commerce systems while increasing the speed/efficiency of the system by reducing the amount of information that will need to be provided from a server back to a user of a computing device.

More particularly and by way of example only, the following describes a system and method for providing a graphical user interface presented on a computing device with contextual search result filtering capability. The system causes the graphical user interface to be displayed in a display of the computing device. The graphical user interface has an input element for receiving from a user a search criteria to be submitted to a server device in communication with the computing device as a search request. The server device has an associated search engine and an associated repository of item information wherein each element of item information in the repository of item information is cross-referenced to one or more contextual filters and wherein the one or more contextual filters correspond to sensor obtained data. The system also causes the computing device to provide to the server device data obtained from one or more sensors resident on the computing device. The server device functions to monitor the computing device as the user provides the search criteria via use of the input element and functions to dynamically and automatically suggest to the user within the graphical user interface one or more of the contextual filters from the repository of item information as a function of the search criteria being provided by the user and the data obtained from the one or more sensors resident on the computing device. The computing device receives input indicative a selection of one or more of the suggested contextual filters and, in response to the search criteria being submitted to the server device as a search request, the search engine is caused to use the search criteria to locate within the repository of item information one or more elements of item information and, thereafter, the server device functions to filter the located one or more elements of item information as a function of the selected one or more of the suggested contextual filters. The filtered one or more elements of item information are returned to the computing device for display as a search result that is responsive to the search query.

A better understanding of the objects, advantages, features, properties and relationships of the systems and methods described hereinafter will be obtained from the following detailed description and accompanying drawings which set forth illustrative embodiments.

BRIEF DESCRIPTION OF THE DRAWINGS

For a better understanding of the hereinafter described systems and methods for providing a user interface with contextual search result filtering capability reference may be had to preferred embodiments shown in the following drawings in which.

DETAILED DESCRIPTION

As will be appreciated by those of ordinary skill in the art, current e-commerce systems often include user interfaces that include search result filters for use in refining the results of a search after a search to locate one or more items of interest within a database associated with one or more vendors of items is performed and returned to a user (wherein "items" may include goods and/or services). Typical search result filters are used to filter the results of a search whereupon the returned search results will be limited to items of a particular brand, items originating from a particular country, items having a particular color and/or size, items having a particular price point or price range, and the like. While such systems generally work for their intended purpose, the hereinafter described systems and methods improve upon such known e-commerce systems by automatically and dynamically providing a user interface with one or more contextual search result filters.

Figure 1:
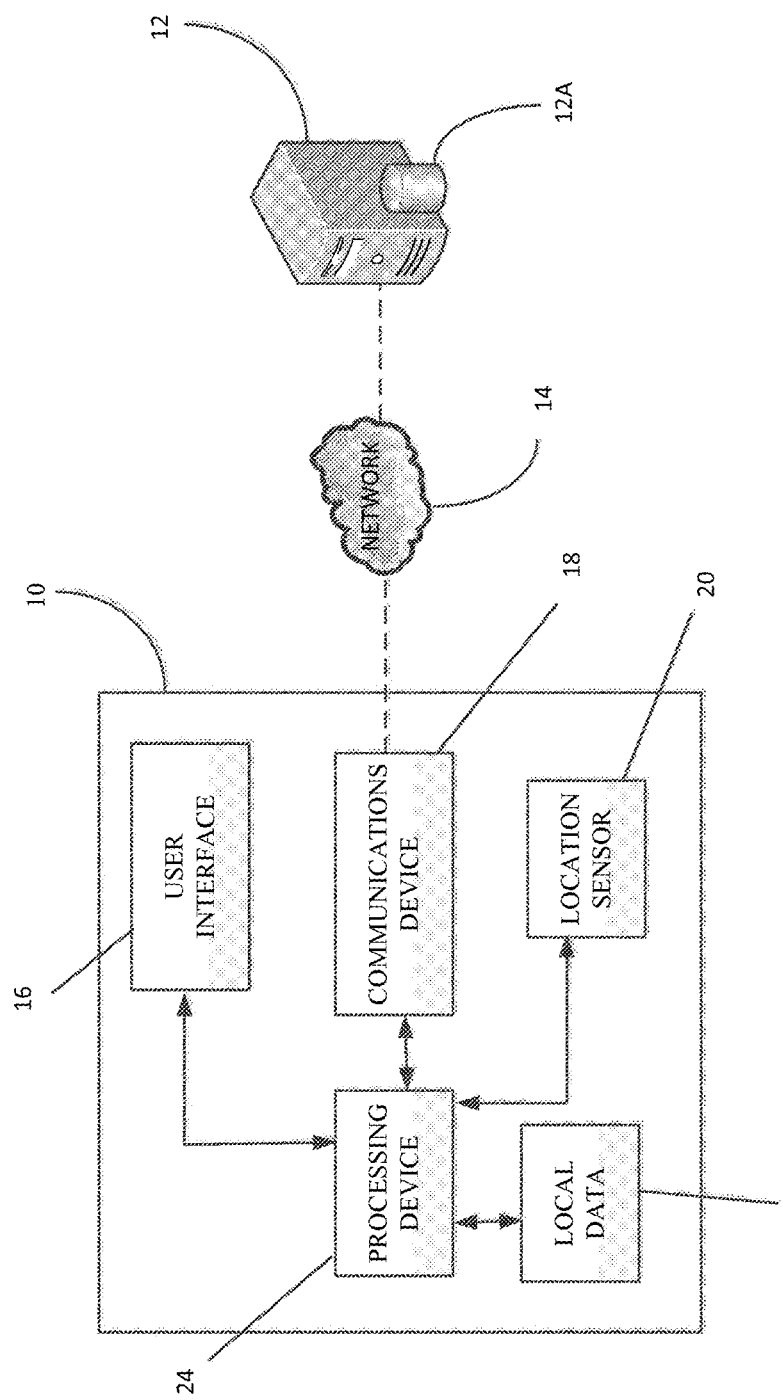
FIG. 1 illustrates a block diagram on an exemplary system for providing a user interface with contextual search result filtering capability.

More particularly, FIG. 1 illustrates an exemplary system for providing a user interface with one or more contextual search result filters, for example, search result filters that are associated with a sensed geographical location and/or associated with other sensor determined contexts. To this end, the system includes a mobile device 10, such as a smart phone, tablet computing device, laptop computing device, or the like, which may communicate, as necessary, with a server device 12, having an associated data repository 12A. Communications between the mobile device 10 and server device 12 may be made via a network 14, such as a local area network and/or a wide area network.

As further illustrated in FIG. 1, the mobile device 10 preferably includes components that are conventionally included in a mobile computing device such as, by way of example only, a user interface component 16 (e.g., a touch screen display), a communications device 18 (e.g., RF, IR, and/or other protocol type receiver, transmitter, and/or transceiver), one or more sensing devices 20 (illustrated in the exemplary form of a location sensing device), a local data store 22 (e.g., RAM, ROM, and/or other physically embodied memory devices/computer-readable memory) having stored thereon data, processor executable instructions (e.g., apps), and/or the like, and a processing device 24 to control the operations of the various elements. In the exemplary form of a location sensing device, the sensing device 20 determines and/or receives location information for use by the system. The location information may be absolute location information, e.g., a latitude, longitude, and/or elevation, and/or relative location information, e.g., near a known location, within and/or outside a known location, etc. By way of non-limiting example, the sensing device 20 may be a device resident on the mobile device 10, e.g., a location sensing device that determines location via use of one or more signals received from satellites, cellular phone towers, network access points, positioned beacons, etc., and/or a device resident on the mobile device 10 that receives information from another device, e.g., a device capable of determining absolute or relative location for provision to the mobile device 10. For purposes that will be described in greater detail below, such sensor derived information, which is indicative of a context, will correspond to one or more search result filters.

It will be additionally appreciated that the mobile device 10 may also include a subset of above-described components, e.g., a display, a sensing device, a processing device, and a transceiver, with the mobile device 10 then being adapted to use information and/or programs stored on other devices, such as in a cloud computing environment. Yet further, while particularly illustrated as including a location sensor, the sensor 20 may equally be a temperature sensor, humidity sensor, touch sensor, motion sensor, light sensor, sound sensor, RF signal detector, etc. that may utilized in addition to or alternatively to the illustrated location sensor and, as with the location sensor, information obtained by such sensor(s), whether determined on the mobile device 10 or provided thereto by other, remotely located sensor(s), will correspond to one or more search results filters. In this regard, when the mobile device 10 is to be provided with information from other sensors, such other sensors can be stationary sensors, e.g., mounted to a wall, embedded in machinery, etc., that function to collect information within a given environment.

Figure 2:
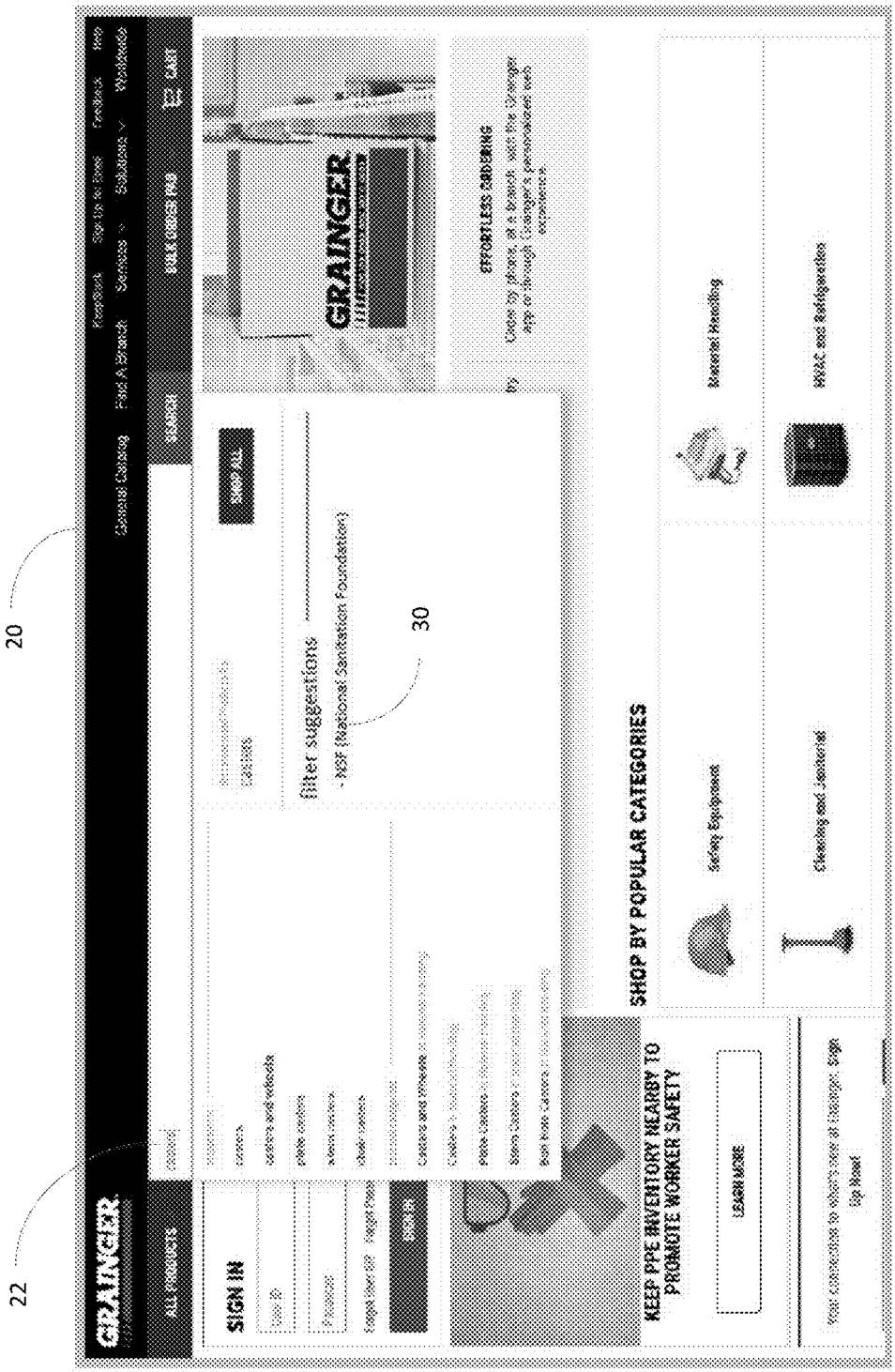
FIG. 2 illustrates an example user interface having contextual search filtering capability.

Turning now to FIG. 2, the user interface component 16 of the mobile device 10 is used to display an e-commerce user interface 20, e.g., a user interface provided to the mobile device 10 from the server 12. The user interface 20 includes user interface elements for allowing a user to specify search criteria for submission to the server 12, e.g., information that is to be used by the server 12 to locate one or more items in the data repository 12A. By way of non-limiting example, the search criteria can be provided to the user interface 20, and ultimately to the server 12, via use of a free-form, text entry input element 22, voice input, selection of a hyperlink, image input, etc. as is well-known in the art. While such information is described as being provided to the server 12 for this purpose, it will also be understood the e-commerce functionality, e.g., the functionality associated with searching for items, etc., can be resident in whole or in part on the mobile device 10 itself.

During the process in which a user prepares a search request, e.g., by specifying a search criteria via use of one or more of the above-noted input elements, for submission to a search engine for the purpose of performing a search for items within the item data repository associated with the server 12 (to the extent the server 12 is utilized in the system), the mobile device 10 may also provide to the server 12 information obtained from one or more of the sensors 20 for use in the manner described further below. The sensor information may be current sensor information, i.e., information obtained by the sensor(s) at the time generally corresponding to the time during which the search request is being formed and provided to the server 12, may be historic sensor information, i.e., some or all of the information obtained by the sensor(s) over a given period of time preceding the time when the search request is being formed and provided to the server 12 (for example, some or all of the information captured by the sensor(s) since a last communication with the server 12), or both. In some instances, information obtained by the sensor(s), whether provided in connection with the submission of a search request to the server 12, provided at other times the mobile device 10 establishes a communication link with the server 12, etc., can be stored in the data repository in association with information that functions to identify the mobile device 10 and/or the user of the mobile device 10, for example by cross-referencing the sensor derived information to a device address provided to the mobile device 10, user login information, etc., whereby such stored information will be available for use by the server 12 in a manner that is also described further below.

Turning again to FIG. 2, as a search request is being prepared by the user for submission to the server 12 (again, in the event a server is utilized in the system), the system uses the information provided by the sensor(s)—whether current, historic, and/or retrieved from data repository 12A for a known device and/or user—to dynamically suggest one or more search result filters 30 that a user may instruct the server 12 to use in connection with a search request, e.g., by clicking thereon or the like, where the election to use one or more of the suggested search result filters 30 is made before the search request is ultimately operated upon by the server 12. In the example illustrated, a filter "products with NSF ratings" is suggested to the user, for example, by being included in a drop down menu or other conventional graphical user interface element, because the sensor derived context is indicative of the user preparing a search request for "casters" while in a food processing location. The search result filters may be automatically and dynamically generated by the server 12 and provided to the mobile device 10 for display in the user interface 20 by having the server 12 use the sensor information and search criteria (in which instance the server 12 will be monitoring the mobile device 10 as the search criteria is being provided by/entered by a user) and/or search result filters may be pre-loaded on the mobile device 10 and caused to be displayed in the user interface 20 under the direction of the server 12 (or under direction of programming resident on the mobile device 10) also using the sensor information and the search criteria. When a user finally requests that the server 12 perform the search, the server 12 will perform a search using the search query in a conventional manner with the results that are returned to the mobile device 10 being pre-filtered as a function of the selected filter(s), if any. As will be appreciated, this method of operation allows a user to have the search results pre-filtered as a function of the query context.

Figure 3:
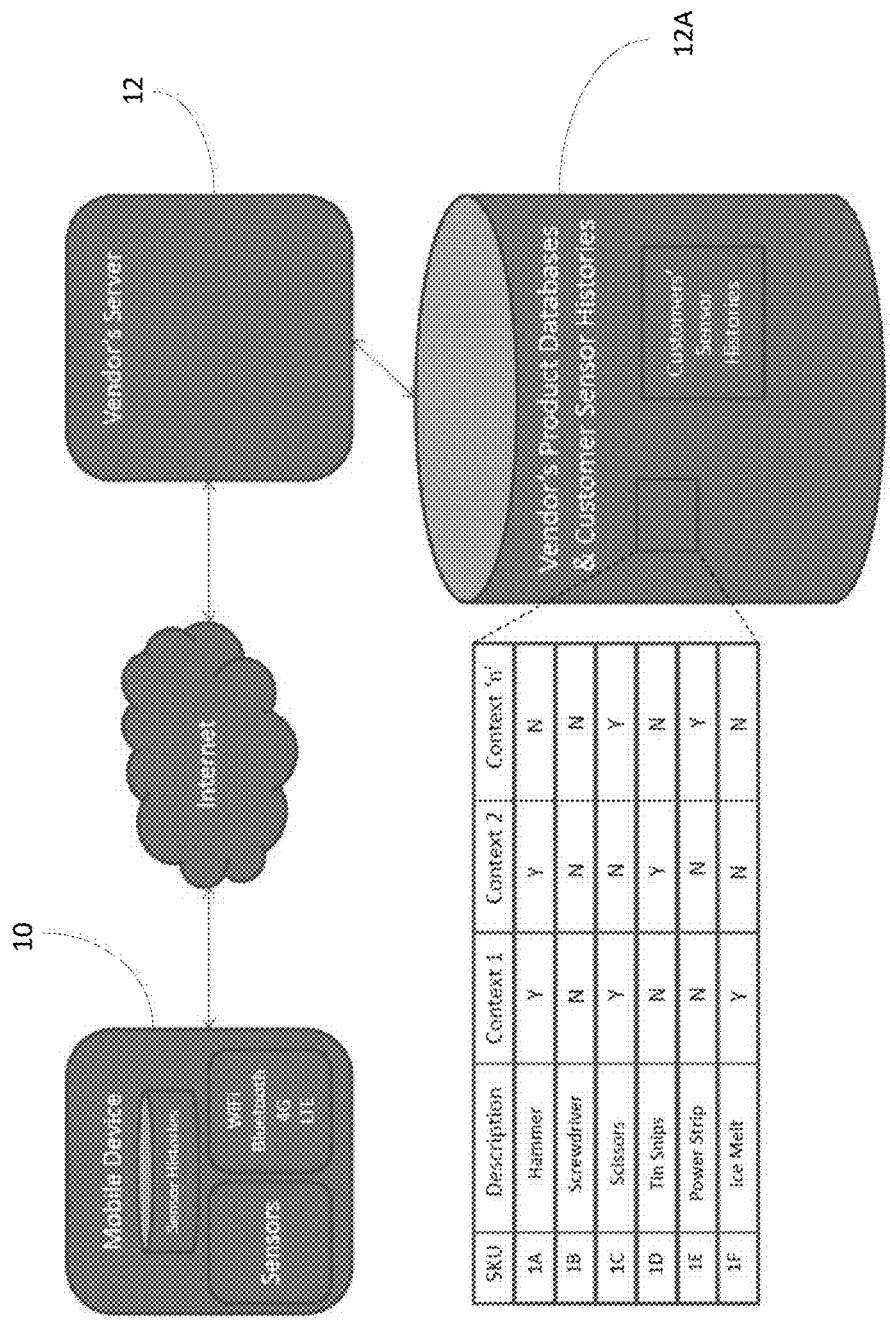
FIG. 3 further illustrates the system of FIG. 1 with an exemplary data store.

As shown in FIG. 3, the item information stored in the data repository 12A is preferably cross-referenced to one or more possible contexts. This stored information is used by the server 12 to determine if an item meeting the provided search criteria should be returned to the user as a search result ("Y") or omitted from the search result ("N") given the sensor determined context associated with the submitted search request. Furthermore, for determining which filters to present to a user, the system may use the cross-referenced context information maintained in the data store by, for example, determining that the user is entering a search criteria that is representative of a given item and/or a given category of item, e.g., hammer or tools, whereupon the system will provide to the user interface only those contextual filters that have been associated with that given item and/or given category of item within the data store. Thus, as shown in FIG. 3, if the system determines that the user is searching for a "hammer," the filters provided to the user may include the "context 1," "context 2"... "context n" filters that have been cross-referenced to the "hammer" item within the data store. As will be further appreciated, in the case of a free-form, text entry input element, the contextual filters may be caused to change/update as the user adds additional letters into the input element, i.e., as the search term becomes more narrow. Furthermore, the system may function to limit the number of contextual filters presented to a user (or inhibit the presentation of contextual filters) until such time as the search criteria being entered by a user is cross-referenced to a predetermined number of different contextual filters within the data store.

To further explain the system, the following use cases are presented by way of example only.

If a contractor is entering a search request for "caulk" using their mobile device, information obtained from a location sensor which is indicative of the user being outdoors can be used by the system to present an "for outdoor use" filter for possible selection by a user. In this manner, should the user submit the search request with the "for outdoor use" filter having been selected/activated, the server 12 will return to the user 12 not all "caulk" related items that are maintained in the item data store but only those "caulk" related items that have been cross-referenced in the item data store to the "for outdoor use" context. In this manner, the amount of information the server 12 needs to transmit to the mobile device 10 can be limited while also making it easier for the use to see, and possibly order, an item that is of actual interest to the user.

Similarly, if sensor information indicates that a user is currently within or has a history of entering a men's restroom, a "men's" filter for possible selection by a user can be presented to the user when the user is determined to be searching for items within a relevant category, e.g., clothing items, toiletry items, etc. Again, should the user submit the search request with the "men's" filter having been selected/activated, the server 12 will return to the user those items that have been cross-referenced to the "men's" context.

Likewise, information from a temperature sensor can be used to determine a context that the user/mobile device is outdoors, in a warm or cold location, or the like whereby an appropriate contextual filter can be suggested for selection by a user, information from an accelerometer can be used to determine that the user is tall (e.g., by using stride analysis), is a runner, etc. whereby an appropriate contextual filter (e.g., "size large," "running shoes," etc.) can be suggested for selection by a user, sensors associated with the side of the mobile device, the touch screen, or the like can determine that the user is left-handed, has extra-large hands, etc. whereby an appropriate contextual filter (e.g., "left-handed items," "size extra-large," etc.) can be suggested for selection by the user, and the like.

It will also be appreciated that sensor information captured for a user and stored in the data repository 12A can be utilized in the same manner to suggest filter(s) for that same user in the event the user is performing a search on other devices via use of the system.

While various embodiments of the invention have been described in detail, it will be appreciated by those skilled in the art that various modifications and alternatives to those details could be developed in light of the overall teachings of the disclosure. For example, a user may elect which particular sensor information should be provided to the server and/or used by the system for storage and/or for use in connection with the performance of a search. Furthermore, while the contextual filters are described as being suggested before a search request is operated upon by a search engine, it will be appreciated that such contextual filters can be recommended for application to search results that are returned to a computing device after the search results are returned to the computing device. Accordingly, the particular arrangements disclosed are meant to be illustrative only and not limiting as to the scope of the invention which is to be given the full breadth of the appended claims and any equivalents thereof.

What is claimed is:

1. A method for providing a graphical user interface presented on a computing device with contextual search result filtering capability, comprising:

causing the graphical user interface to be displayed in a display of the computing device, the graphical user interface having an input element for receiving from a user a search criteria to be submitted to a server device in communication with the computing device as a search request, wherein the server device has an associated search engine and an associated repository of item information wherein each element of item information in the repository of item information is cross-referenced to one or more contextual filters and wherein the one or more contextual filters correspond to sensor obtained data;

causing the computing device to provide to the server device data obtained from one or more sensors resident on the computing device;

monitoring by the server device the search criteria as the user provides the search criteria via use of the input element;

causing the server device to dynamically and automatically suggest to the user within the graphical user interface one or more of the contextual filters from the repository of item information as a function of the search criteria being provided by the user and the data obtained from the one or more sensors resident on the computing device;

receiving into the computing device a selection of one or more of the suggested contextual filters;

in response to the search criteria being submitted to the server device as a search request, causing the search engine to use the search criteria to locate within the repository of item information one or more elements of item information and, thereafter, causing the server device to filter the located one or more elements of item information as a function of the selected one or more of the suggested contextual filters;

returning to the computing device for display in the display of the computing device the filtered one or more elements of item information as a search result.

2. The method as recited in claim 1, wherein the suggested contextual filters are presented in a drop down menu element of the graphical user interface.

3. The method as recited in claim 1, wherein the one or more sensors comprises a location sensor.

4. The method as recited in claim 1, wherein the one or more sensors comprises an accelerometer.

5. The method as recited in claim 1, wherein the one or more sensors comprises a temperature sensor.

6. The method as recited in claim 1, wherein the server device is caused to dynamically and automatically suggest to the user within the graphical user interface one or more of the contextual filters from the repository of item information only when the search criteria being provided by the user is indicative of items within the data repository that are cross-referenced to less than a predetermined number of contextual filters.

7. The method as recited in claim 1, wherein user input is received at the computing device to select one or more of the sensors for providing data to the server device.

8. The method as recited in claim 1, wherein the data from the one or more sensors is provided by the computing device at a time generally corresponding to a time during which the search criteria is being provided by the user via use of the input element.

9. The method as recited in claim 8, wherein the data from the one or more sensors comprises historical sensor data.

10. The method as recited in claim 8, wherein the data from the one or more sensors comprises current sensor data.

11. The method as recited in claim 1, wherein the data from the one or more sensors is provided by the computing device periodically at times when the computing device establishes a communicative connection with the server device.

12. The method as recited in claim 11, wherein the data from the one or more sensors comprises historical sensor data.

13. The method as recited in claim 11, wherein the data from the one or more sensors provided to the server device is stored in the data repository in association with data that functions to identify the computing device.

14. The method as recited in claim 1, wherein the data from the one or more sensors provided to the server device is stored in the data repository in association with data that functions to identify the user.

15. The method as recited in claim 14, wherein the data from the one or more sensors stored in the data repository in association with data that functions to identify the user is used by the server device when dynamically and automatically suggesting to the user within the graphical user interface one or more of the contextual filters from the repository of item information.

16. The method as recited in claim 15, wherein the data from the one or more sensors stored in the data repository in association with data that functions to identify the computing device is used by the server device when dynamically and automatically suggesting to the user within the graphical user interface one or more of the contextual filters from the repository of item information.

17. A method for providing a graphical user interface presented on a computing device with contextual search result filtering capability, comprising:

causing the graphical user interface to be displayed in a display of the computing device, the graphical user interface having an input element for receiving from a user a search criteria to be submitted to a server device in communication with the computing device as a search request, wherein the server device has an associated search engine and an associated repository of item information wherein each element of item information in the repository of item information is cross-referenced to one or more contextual filters and wherein the one or more contextual filters correspond to sensor obtained data;

causing the computing device to provide to the server device data obtained from one or more sensors in communication with the computing device;

monitoring by the server device the search criteria as the user provides the search criteria via use of the input element;

causing the server device to dynamically and automatically suggest to the user within the graphical user interface one or more of the contextual filters from the repository of item information as a function of the search criteria being provided by the user and the data obtained from the one or more sensors in communication with the computing device;

receiving into the computing device a selection of one or more of the suggested contextual filters;

in response to the search criteria being submitted to the server device as a search request, causing the search engine to use the search criteria to locate within the repository of item information one or more elements of item information and, thereafter, causing the server device to filter the located one or more elements of item information as a function of the selected one or more of the suggested contextual filters;

returning to the computing device for display in the display of the computing device the filtered one or more elements of item information as a search result.

18. The method as recited in claim 17, wherein the data from the one or more sensors is provided by the computing device at a time generally corresponding to a time during which the search criteria is being provided by the user via use of the input element.

19. The method as recited in claim 17, wherein the data from the one or more sensors comprises historical sensor data.

20. The method as recited in claim 17, wherein the data from the one or more sensors comprises current sensor data.

* * * * *